United States Patent
Ichikawa et al.

(10) Patent No.: US 6,510,423 B1
(45) Date of Patent: Jan. 21, 2003

(54) METHOD AND DEVICE FOR OBJECT CONTROL WITH A PLURALITY OF OPERATION-TARGET FLAGS

(75) Inventors: Tamotsu Ichikawa, Kawasaki (JP); Hiroaki Komine, Kawasaki (JP); Tsuyoshi Naka, Kanazawa (JP); Kazuyuki Okumura, Kanazawa (JP); Kazuaki Ikeda, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/415,069

(22) Filed: Oct. 12, 1999

(30) Foreign Application Priority Data

Oct. 15, 1998  (JP) .......................................... 10-293194

(51) Int. Cl.$^7$ ............................................. G06F 17/30
(52) U.S. Cl. .......................................... 707/3; 707/100
(58) Field of Search ................ 707/1–4, 10, 100–102, 707/103, 103 R, 103 Y, 103 Z

(56) References Cited

U.S. PATENT DOCUMENTS

| | | | | |
|---|---|---|---|---|
| 5,146,540 A | * | 9/1992 | Natarajan | 700/5 |
| 5,664,172 A | * | 9/1997 | Antoshenkov | 707/3 |
| 5,734,903 A | * | 3/1998 | Saulpaugh et al. | 709/238 |
| 5,815,415 A | * | 9/1998 | Bentley et al. | 703/4 |
| 5,857,198 A | * | 1/1999 | Schmidt | 707/103 R |
| 5,946,679 A | * | 8/1999 | Ahuja et al. | 707/3 |
| 6,105,018 A | * | 8/2000 | Demers et al. | 707/1 |

FOREIGN PATENT DOCUMENTS

JP  7-210386  8/1995

* cited by examiner

Primary Examiner—Hosain T. Alam
(74) Attorney, Agent, or Firm—Staas & Halsey L.L.P.

(57) ABSTRACT

A method of controlling objects in an information processing system includes the steps of representing objects by a tree having a hierarchical structure, providing each of the objects with a first operation-target flag which indicates whether a corresponding object is a target of a given operation, and performing the given operation on an object upon receiving of an object handling request for the given operation only if the first operation-target flag of the object indicates that the object is a target of the given operation.

11 Claims, 10 Drawing Sheets

| OBJECT NAME | LOWER-LEVEL-OBJECT NAME | OPERATION-TARGET FLAG FOR OBJECT REQUEST A | OPERATION-TARGET FLAG FOR OBJECT REQUEST N |
|---|---|---|---|
| A | B, E | TARGET | TARGET |
| B | C, D | TARGET | NON-TARGET |
| C | NONE | TARGET | NON-TARGET |
| D | NONE | TARGET | NON-TARGET |
| E | F, G | NON-TARGET | TARGET |
| F | NONE | NON-TARGET | NON-TARGET |
| G | H | NON-TARGET | TARGET |
| H | NONE | NON-TARGET | TARGET |

FIG.2A

| OBJECT NAME | LOWER-LEVEL-OBJECT NAME | OPERATION-TARGET FLAG FOR OBJECT REQUEST A | | OPERATION-TARGET FLAG FOR OBJECT REQUEST N |
|---|---|---|---|---|
| A | B, E | TARGET | | TARGET |
| B | C, D | TARGET | | NON-TARGET |
| C | NONE | TARGET | | NON-TARGET |
| D | NONE | TARGET | | NON-TARGET |
| E | F, G | NON-TARGET | | TARGET |
| F | NONE | NON-TARGET | | NON-TARGET |
| G | H | NON-TARGET | | TARGET |
| H | NONE | NON-TARGET | | TARGET |

FIG.2B

| OBJECT NAME | UPPER-LEVEL-OBJECT NAME | LOWER-LEVEL-OBJECT NAME | OPERATION-TARGET FLAG |
|---|---|---|---|
| A | NONE | B, E | TARGET |
| B | A | C, D | TARGET |
| C | B | NONE | TARGET |
| D | B | NONE | TARGET |
| E | A | F, G | NON-TARGET |
| F | E | NONE | NON-TARGET |
| G | E | H | NON-TARGET |
| H | G | NONE | NON-TARGET |

FIG.8

| RELATIVE OBJECT NAME | ABSOLUTE OBJECT NAME | UPPER-LEVEL-OBJECT NAME | LOWER-LEVEL-OBJECT NAME | OPERATION-TARGET FLAG |
|---|---|---|---|---|
| SYSTEM | SYSTEM | — | SYSTEM ADMIN<br>SYSTEM LAYER | 1 |
| ADMIN | SYSTEM ADMIN | SYSTEM | — | 1 |
| LAYER | SYSTEM LAYER | SYSTEM | SYSTEM LAYER SUBNETWORK | 1 |
| SUBNETWORK | SYSTEM LAYER SUBNETWORK | SYSTEM LAYER | SYSTEM LAYER SUBNETWORK NODE<br>SYSTEM LAYER SUBNETWORK LINK | 1 |
| NODE | SYSTEM LAYER SUBNETWORK NODE | SYSTEM LAYER SUBNETWORK | — | 0 |
| LINK | SYSTEM LAYER SUBNETWORK LINK | SYSTEM LAYER SUBNETWORK | — | 1 |

| OBJECT NAME | LOWER-LEVEL-OBJECT NAME |
|---|---|
| A | B, E |
| B | C, D |
| C | NONE |
| D | NONE |
| E | F, G |
| F | NONE |
| G | H |
| H | NONE |

METHOD AND DEVICE FOR OBJECT CONTROL WITH A PLURALITY OF OPERATION-TARGET FLAGS

BACKGROUND OF THE INVENTION

1. Field of the Invention

The present invention relates to a method of and a device for controlling objects in an information processing system.

Use of an object-oriented scheme is a common practice employed when implementing a data-transfer system, a switch system, etc. When there is a need to create an object, delete an object, and acquire attribute values of objects constituting a system, it becomes necessary to control relations between objects in the system.

2. Description of the Related Art

FIGS. 10A and 10B are illustrative drawings showing a tree model used for controlling of objects.

A containment tree as shown in FIG. 10A is widely used for controlling objects in a hierarchical fashion. In the example of FIG. 10A, objects B and E are located under an object A, and objects C and D are provided under the object B. The object E has objects F and G thereunder. The object F has no object attached thereto while the object G has an object H as a lower-level object attached thereto.

Tree information on the objects A through H having a tree structure described above is controlled by using a table as shown in FIG. 10B. The table stores each object and an indication of whether a given object has a lower-level object located thereunder. If there is a lower-level object, a name of the lower-level object is provided. For example, the table shows that the object A has the objects B and E thereunder, and that the object B has the objects C and D as lower-level objects. Further, the table shows that the objects C and D do not have any lower level objects attached thereto. When a client needs to acquire attribute values of an object or to make settings thereto, tree information as shown in FIG. 10B is used for manipulating a given object.

In the related-art object control, objects are controlled by using relations between upper-level objects and lower-level objects represented in such a manner as shown in FIG. 10B. In a worst scenario, however, all the entries in the table need to be searched for when the tree information is referred to in order to handle an object. Even when a searched object is found, there may be a case in which no handling is performed on that object. As a tree structure becomes more complex, time and labor for searching for an object increase. Because of this, it is difficult to enhance performance of object handling.

Accordingly, there is a need for optimizing a process of controlling objects and for enhancing an operation efficiency of the process.

SUMMARY OF THE INVENTION

Accordingly, it is a general object of the present invention to provide a method of and a device for controlling objects which can satisfy the need described above.

It is another and more specific object of the present invention to provide a method of and a device for controlling objects which can allow efficient handling of objects.

In order to achieve the above objects according to the present invention, a method of controlling objects in an information processing system includes the steps of representing objects by a tree having a hierarchical structure, providing each of the objects with a first operation-target flag which indicates whether a corresponding object is a target of a given operation, and performing the given operation on an object upon receiving of an object handling request for the given operation only if the first operation-target flag of the object indicates that the object is a target of the given operation.

If the objects are related with each other in the hierarchical structure such that the hierarchy shows containment relationships between the objects, all the objects belonging to a given parent object may have an operation-target flag indicating that these objects are non-target objects with respect to a particular operation if the parent object has an operation-target flag indicating a non-target status with respect to this particular operation.

Namely, if a tree structure is configured in such containment relationships, once a parent object is ascertained as a non-target object, all the child objects belonging to the parent objects are known to be non-target objects. A search does not have to be conducted for these child objects because they are known to be non-target objects. This eliminates a need for an unnecessary search to be conducted, resulting in an efficient search in the tree.

Whether the tree is structured in such containment relationships is a matter of design choice made at the time of creating application software.

Even if the tree does not represent containment relationships, however, a search can be more efficient in the present invention than in a related-art configuration. This is because each object represents a class object, and each class object may have many instance objects created thereupon. In a related art, when an object search is requested, such a search needs to be conducted for all the instance objects as well as for the class object. In the present invention, however, a search does not have to be conducted for the instance objects if the search of the class object indicates that the class object is a non-target object. That is, an unnecessary search for the instance objects which are known to be non-target objects can be eliminated.

In this manner, the present invention achieves an efficient search by attaching an operation-target flag to each object controlled in a form of an object tree.

Other objects and further features of the present invention will be apparent from the following detailed description when read in conjunction with the accompanying drawings.

BRIEF DESCRIPTION OF THE DRAWINGS

FIGS. 2A and 2B are illustrative drawings showing a table format used for controlling objects;

FIG. 8 is an illustrative drawing showing a table structure of the second embodiment;

DESCRIPTION OF THE PREFERRED EMBODIMENTS

In the following, embodiments of the present invention will be described with reference to the accompanying drawings.

Figure 1:
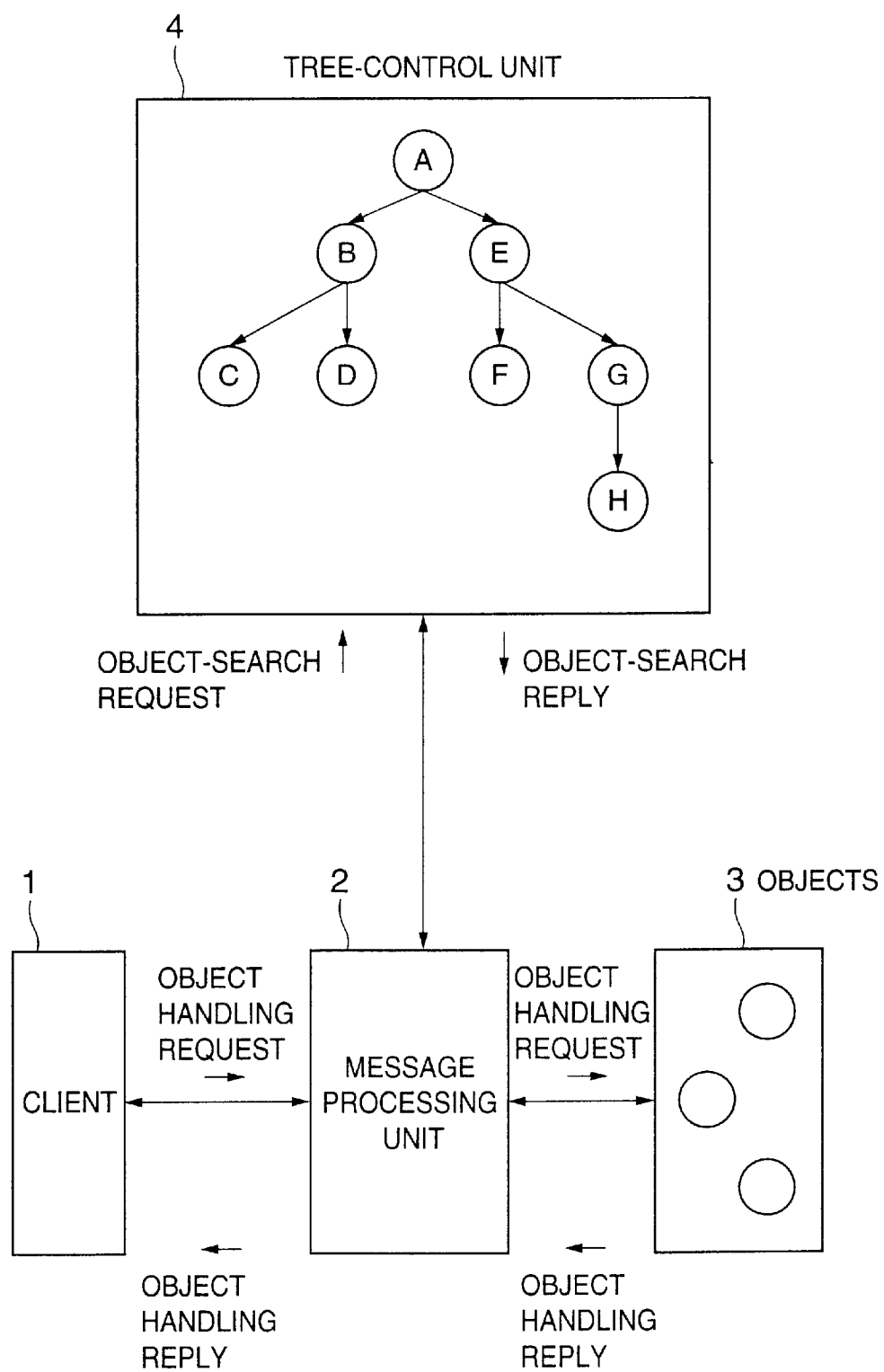
FIG. 1 is an illustrative drawing showing a configuration of a device for controlling objects according to an embodiment of the present invention.

FIG. 1 is an illustrative drawing showing a configuration of a device for controlling objects according to an embodiment of the present invention.

The device of FIG. 1 includes a client 1, a message processing unit 2, objects 3, and a tree-control unit 4.

The client 1 may be provided as many as necessary. When the client 1 sends an object-handling-request message to the message processing unit 2, the message processing unit 2 requests the tree-control unit 4 to conduct an object search. The tree-control unit 4 returns an object-search reply to the message processing unit 2 to inform of results of the object search. Based on the results of the object search, the message processing unit 2 sends an object-handling request to the objects 3. The objects 3 return an object-handling reply to the message processing unit 2 after completing a process requested by the object-handling request. The message processing unit 2 in turn sends an object-handling reply to the client 1.

The tree-control unit 4 stores information on an object tree in table format. In the present invention, further, an operation-target flag is provided to indicate whether a given object is subjected to object handling. The operation-target flag is provided with respect to each object entry in the tree-information table of the tree-control unit 4.

FIGS. 2A and 2B are illustrative drawings showing a table format used for controlling objects.

As shown in FIG. 2A, information on a tree structure is represented by using names of objects, names of lower-level objects attached thereto, and operation-target flags. Each operation-target flag indicates whether a corresponding object is subjected to object handling. In an example of FIG. 2A, each operation-target flag for an object request A indicates, with respect to the objects A, B, C, and D, that a corresponding object is a target of this operation request, and indicates that the objects E, F, G, and H are not a target. Further, an operation-target flag for another object request N is also provided with respect to each of the objects A through H.

Figure 3:
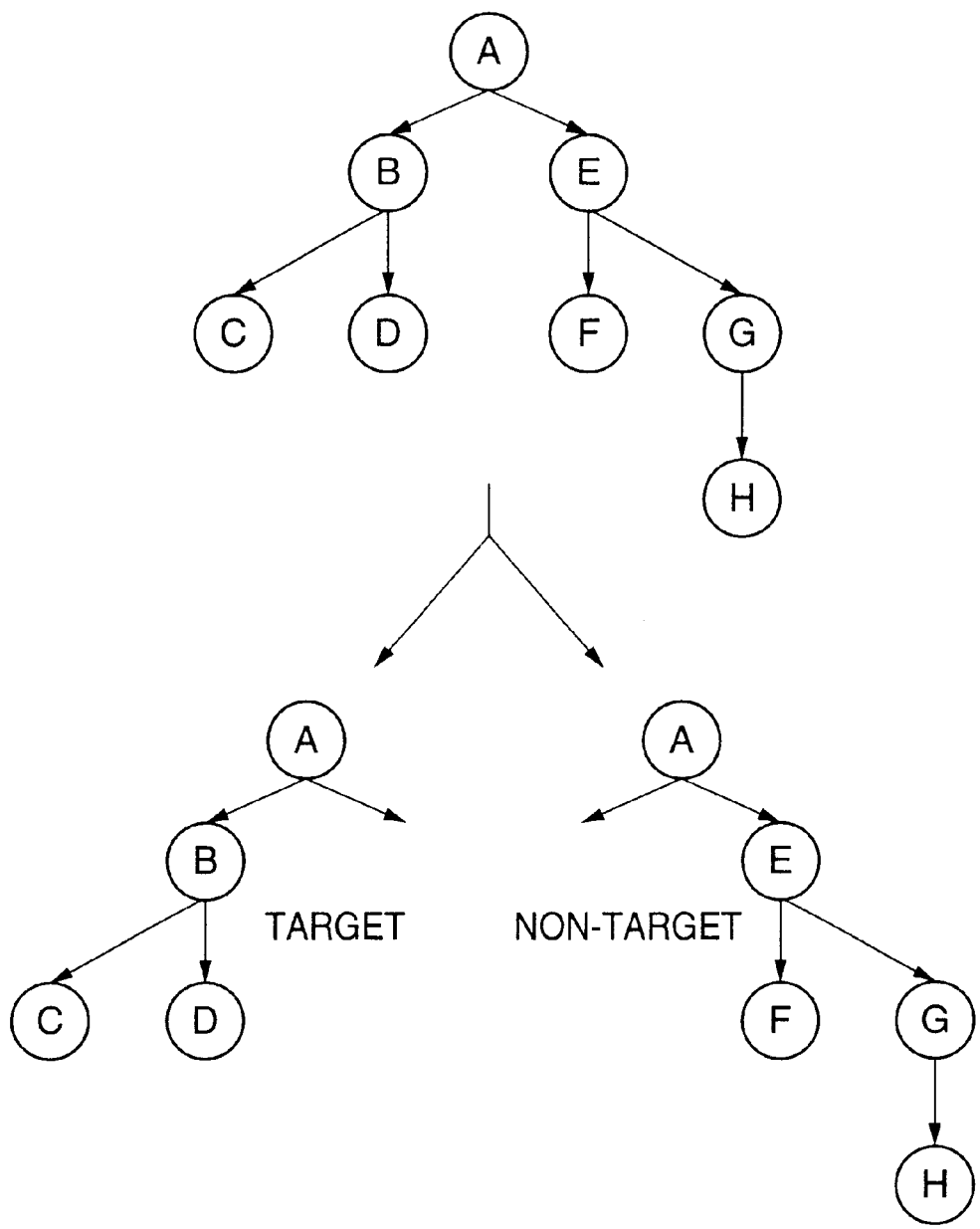
FIG. 3 is an illustrative drawing for explaining advantages of use of an operation-target flag.

FIG. 3 is an illustrative drawing for explaining advantages of use of an operation-target flag.

A tree structure controlled by the tree-control unit 4 is shown at the top of FIG. 3. A tree shown at the bottom left shows a set of objects that are subjected to object handling, and a tree shown at the bottom right shows a set of objects that are targets of the object handling. In this manner, the use of the operation-target flag makes it possible to divide the original tree into a tree comprised of target objects and a tree comprised of non-target objects. This makes it possible to eliminate an unnecessary search process for non-target objects.

In this example, the objects A through H are related with each other in a hierarchical structure such that the hierarchy shows containment relationships between the objects. Namely, a given object and a lower object attached to this given object in the hierarchical structure are related through a containment relationship. In such a case, the lower object may be a child object inheriting all the attributes of the given object serving as a parent object. In such a containment hierarchy, all the objects belonging to a parent object have an operation-target flag indicating that these objects are non-target objects with respect to a particular operation if the parent object has an operation-target flag indicating this parent object as a non-target object with respect to this particular operation.

If a tree structure is configured in such containment relationships, once a parent object is ascertained as a non-target object, all the child objects belonging to the parent objects are known to be non-target objects. A search does not have to be conducted for these child objects because they are known to be a non-target object. This eliminates a need for an unnecessary search to be conducted, resulting in an efficient search in the tree.

Whether the tree is structured in containment relationships is a matter of design choice made at the time of creating application software.

Even if the tree does not represent containment relationships, however, a search can be more efficient in the present invention than in a related-art configuration. This is because each object denoted as the objects A through H, for example, represents a class object, and each class object may have many instance objects created thereupon.

For example, the object F is a class object, and a plurality of instance objects created based on this class object may be present in the system. In a related art, when an object search is requested, such a search needs to be conducted for all the instance objects as well as for the class object F. In the present invention, however, a search does not have to be conducted for the instance objects if the search of the object F indicates that the object F serving as a class object is a non-target object. That is, an unnecessary search for the instance objects which are known to be non-target objects can be eliminated.

In this manner, the present invention achieves an efficient search by attaching an operation-target flag to each object controlled in a form of an object tree.

Figure 4:
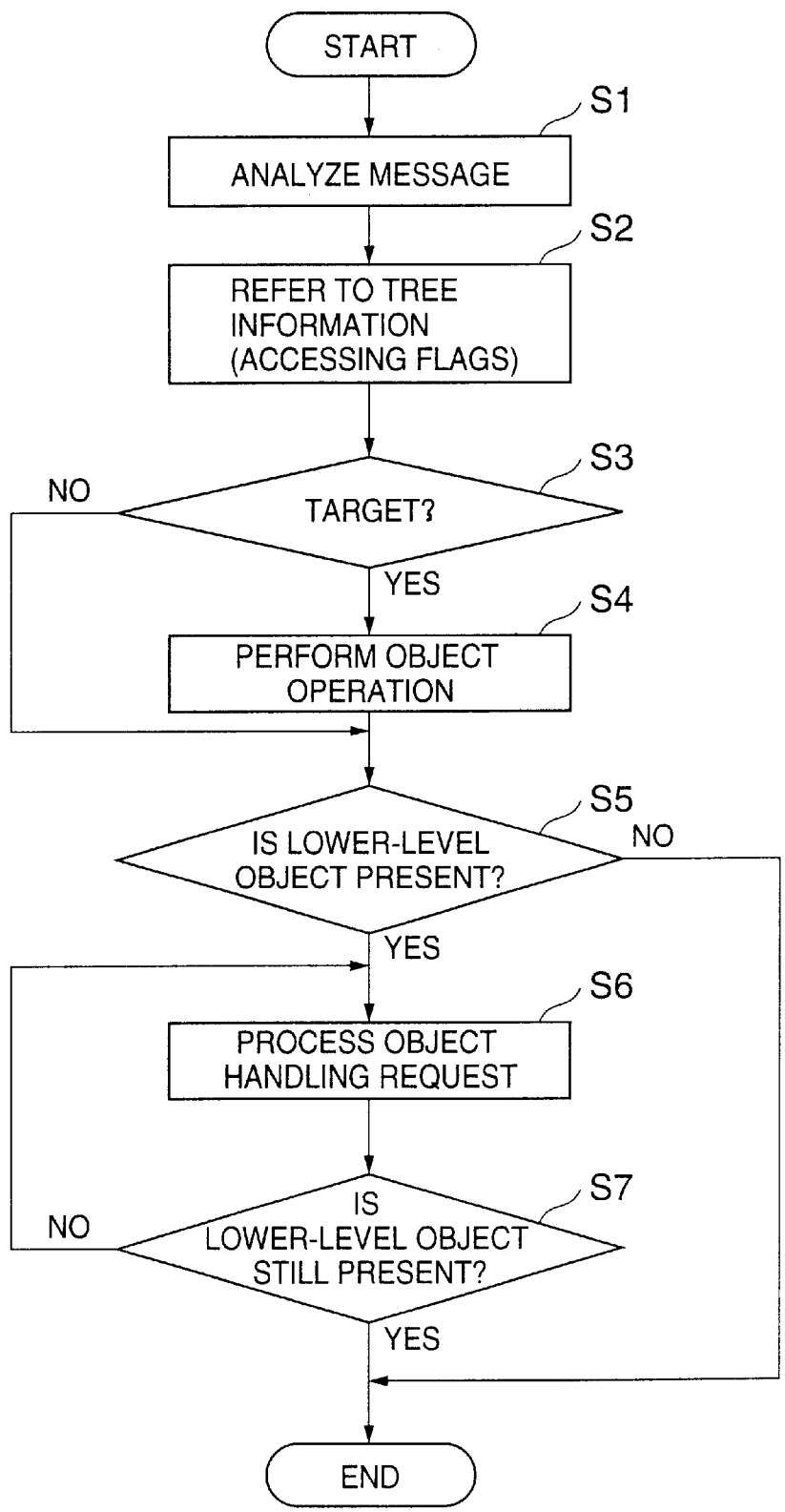
FIG. 4 is a flowchart of object handling according to the embodiment of the present invention.

FIG. 4 is a flowchart of object handling according to the embodiment of the present invention.

At a step S1, the message processing unit 2 analyzes a message from the client 1.

At a step S2, the message processing unit 2 refers to the tree information of the tree-control unit 4 when the message is an object-handling-request message. In so doing, a relevant operation-target flag is accessed in accordance with a type of the object-handling request.

At a step S3, the tree-control unit 4, responding to an object-search request from the message processing unit 2, determines whether a given object is a target of the object handling. In detail, the relevant operation-target flag of this object is checked to determine if the flag is on or off.

If the object is not a target of this object operation, i.e., if the relevant operation-target flag is off, the procedure goes to a step S5. If the object is a target of this object operation, i.e., if the relevant operation-target flag is on, the procedure goes to a step S4.

At the step S4, an object operation is performed with respect to the indicated object. Such an object operation may be acquisition of attribute values or making of settings to the object. After the step S4, the procedure proceeds to the step S5.

At the step S5, the tree information is consulted to determine whether there is a lower-level object. If there is no lower-level object, the procedure ends. If there is a lower-level object, the procedure goes to a step S6, where an object handling request is processed with respect to this lower-level object.

At a step S7, a check is made if there is any other lower-level object to be operated. If there is, the procedure goes back to the step S6 to repeat the steps S6 and S7. If there is no remaining lower-level object, the procedure ends.

Here, the flowchart of FIG. 4 has a nested structure, in which an object handling request is processed at the step S6 by carrying out the steps S2 through S7 of FIG. 4 with respect to the lower level object currently processed at the step S6. That is, a decision is made as to whether this lower level object is a target object, and, further, a decision is made as to whether this lower level object has a further lower level object.

According to the procedure described above, no object operation is performed if the relevant operation-target flag is in an off state indicative of a non-target status of the object. After completing a process in response to the object-handling request from the client 1, an object-handling reply is returned to the client 1.

It should be noted that a check of an operation-target flag is made with respect to each lower level object in the procedure described above. If the tree structure represents such containment relationships between the objects as lower level objects are known to be non-target objects provided that a parent object is a non-target object, a search for lower level objects may not be necessary.

As previously described, even if the tree does not represent containment relationships, a search can be efficient in the present invention. This is because each object represents a class object, and each class object may have many instance objects created thereupon. In the present invention, therefore, a search does not have to be conducted for the instance objects if the search of the class object indicates that the class object is a non-target object. That is, an unnecessary search for the instance objects which are known to be non-target objects can be eliminated.

This embodiment has been described with reference to a case in which an operation-target flag is set in advance with respect to each object as shown in FIG. 2A. Alternatively, an on/off state of the operation-target flag may be changed dynamically in response to a request from the client 1.

Further, a bit used as an operation-target flag may be assigned with respect to each client 1, and may be attached to an object-handling-request message when the client 1 sends the object-handling-request message. In response, the message processing unit 2 extracts this bit, and determines whether an operation should be performed on objects.

This configuration is effective when there are a plurality of users or when there are a plurality of trees, for example. When there are a plurality of users each having his/her own set of objects in the system, an object-handling-request message prompts a search for objects belonging to a particular user when an operation-target flag of this message corresponding to this particular user indicates handling of objects. This configuration also achieves an efficient search.

According to one aspect of the present invention, an operation-target flag for a given object request may be set in the tree information as shown in FIG. 2A, and a bit used as an operation-target flag may be attached to an object-handling-request message when the client 1 sends the object-handling-request message. In this case, the message processing unit 2 refers to the tree information of the tree-control unit 4 in response to the object-handling-request message, and compares the operation-target flag of a given object found in the tree information with the operation-target flag attached to the object-handling-request message. If both flags indicate that the object is a target of the object handling, the operation is performed on this object.

Such configuration as described above can easily cope with situations where objects are added or deleted. Even when an existing object is not a target at present, a change of such a target status, which may later become necessary, can be easily made by changing the setting of the operation-target flag. Further, various conditions can be added to achieve diligent control of a target/non-target status.

In the above example, the tree information provided in the table format as shown in FIG. 2A includes names of objects, lower-level objects attached thereto, and operation-target flags. In addition to these entries, names of upper-level objects may be provided as shown in FIG. 2B. The table of FIG. 2B shows that the object A does not have an upper-level object corresponding thereto, but has the lower-level objects B and E, with an operation-target flag of the object A being set to an on status. Further, the table shows that the object B has the object A as an upper-level object and the objects C and D as lower-level objects, and the operation-target flag of the object B indicates an on status. By the same token, the object G has the upper object E, and has the object H as a lower-level object. The operation-target flag of the object G is off, indicating a non-target status of the object G.

Additional entries of names of upper-level objects makes it possible to conduct an object search not only from an upper level toward a lower level but also from a lower level toward an upper level. Since deletion/addition of objects can be made by referring to upper-level objects as well as lower-level objects, a necessary object search can be easily made.

Figure 5:
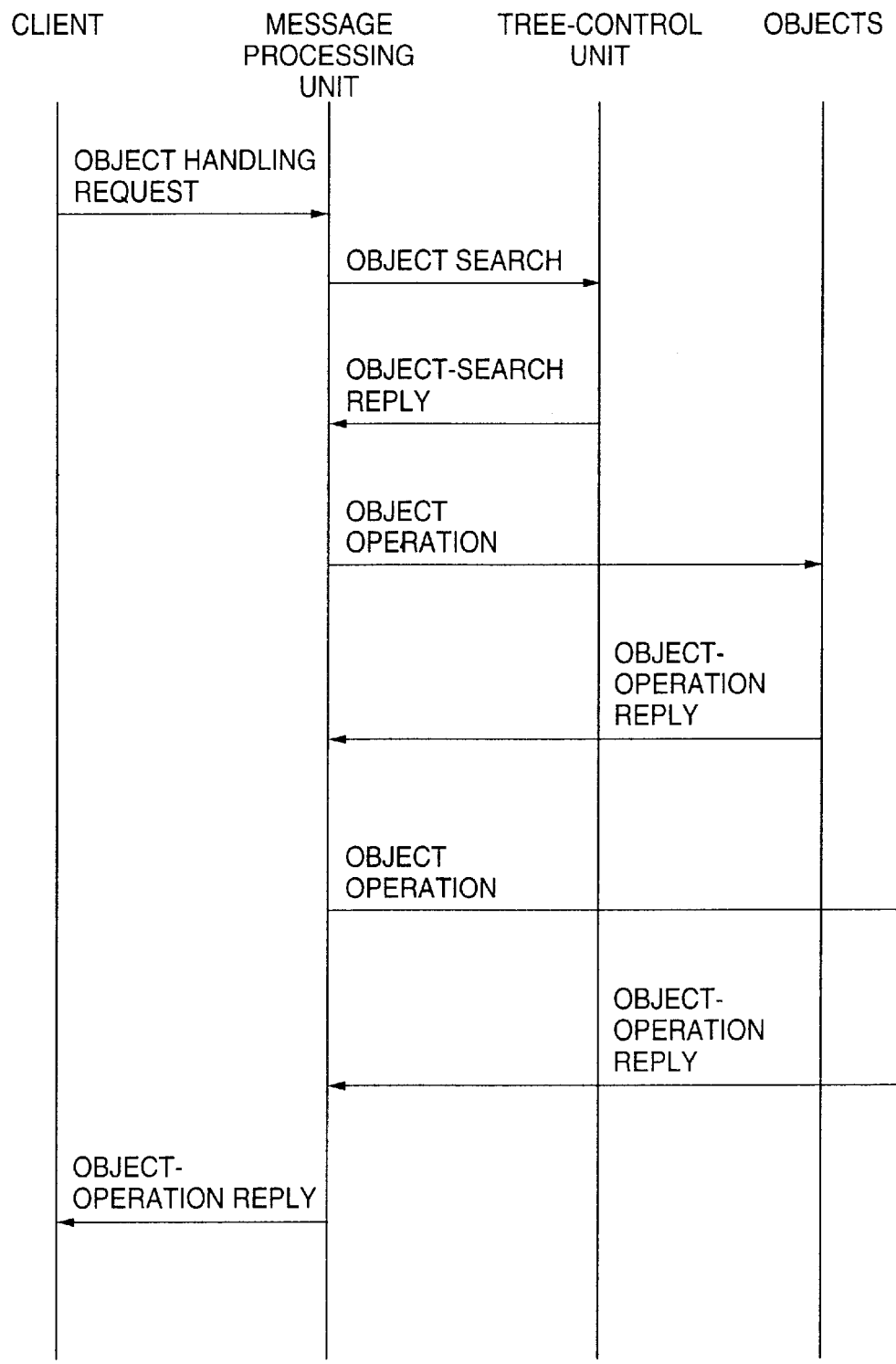
FIG. 5 is a sequence chart for explaining synchronous handling of a plurality of objects according to the embodiment of the present invention.

FIG. 5 is a sequence chart for explaining synchronous handling of a plurality of objects according to the embodiment of the present invention.

In this example, operations on a plurality of objects are performed sequentially. The client 1 sends an object-handling request for the plurality of objects to the message processing unit 2. Based on the object-handling request, the message processing unit 2 requests the tree-control unit 4 to conduct an object search. Upon receiving an object-search reply from the tree-control unit 4, the message processing unit 2 sends an object-handling request to one of the target objects. Then, the message processing unit 2 receives an object-handling reply indicating a completion of the operation. Then, the message processing unit 2 sends an object-handling request to a next one of the target objects. Upon receiving an object-handling reply indicating a completion of the operation, the message processing unit 2 transmits an object-handling reply to the client 1. When there are more than two objects to be operated, handling of an object is requested one after another upon a completion of an operation of a current object. In this manner, object operations are performed successively while the message processing unit 2 and the objects 3 are synchronized with each other.

Figure 6:
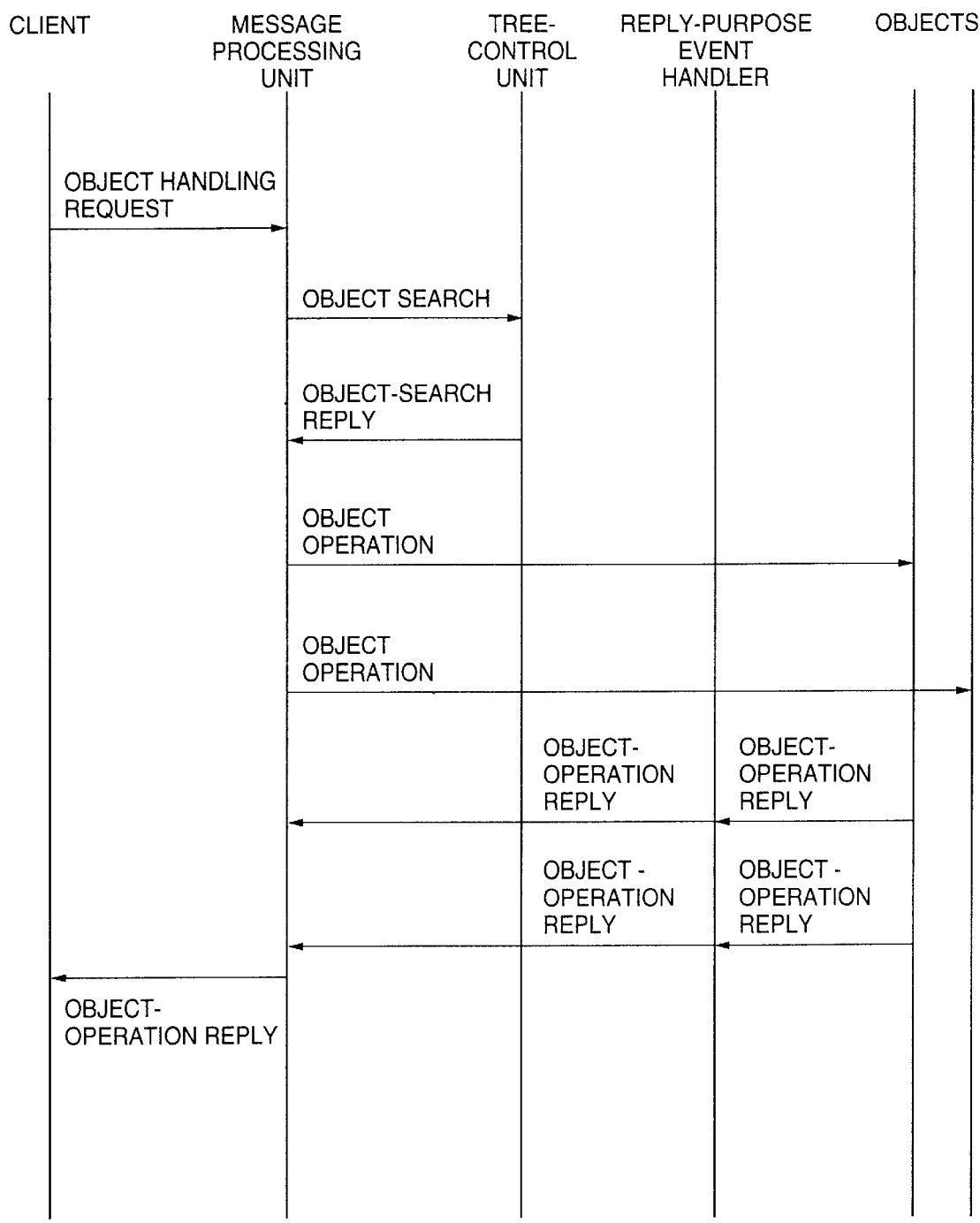
FIG. 6 is a sequence chart for explaining a synchronous handling of a plurality of objects according to a second embodiment of the present invention.
Figure 7:
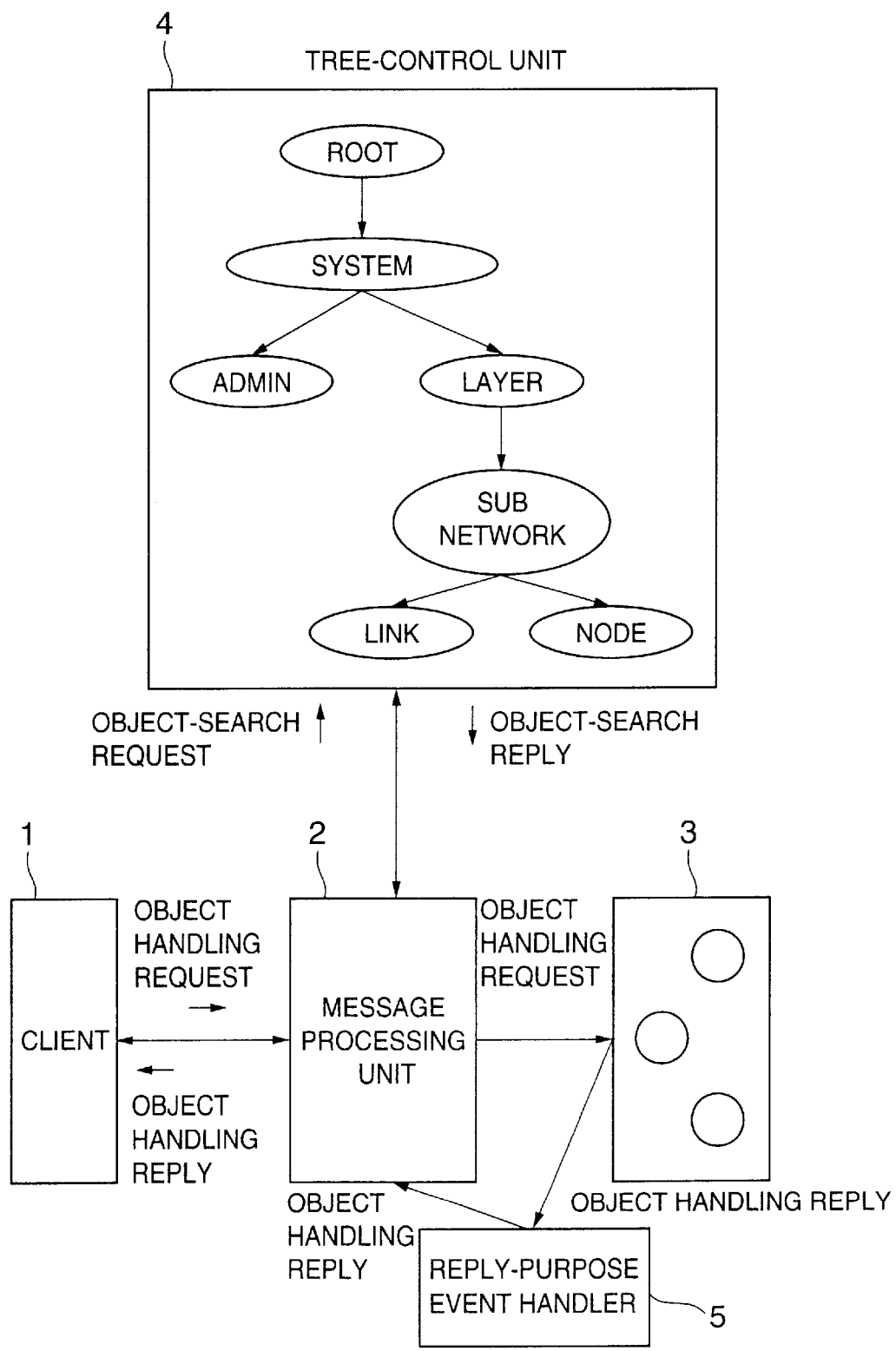
FIG. 7 is an illustrative drawing showing a configuration of a device for a synchronous control of objects according to the second embodiment of the present invention.

FIG. 6 is a sequence chart for explaining a synchronous handling of a plurality of objects according to a second embodiment of the present invention. FIG. 7 is an illustrative drawing showing a configuration of a device for a synchronous control of objects according to the second embodiment of the present invention. FIG. 8 is an illustrative drawing showing a table structure of the second embodiment.

In the second embodiment, a plurality of objects are operated in parallel. To this end, the device of this embodiment includes a reply handler (reply-purpose event handler) 5 as shown in FIG. 7. An object tree controlled by the tree-control unit 4 has a tree structure as shown in FIG. 7. This tree structure is represented in a table format as shown in FIG. 8. The table of FIG. 8 corresponds to that of FIG. 2B, and includes relative object names, absolute object names, upper-level object names, lower-level object names, and operation-target flags, all of which are stored to indicate correspondences therebetween.

In FIG. 8, an object name (as in FIG. 2B) is represented by both a relative object name and an absolute object name. Each of an upper-level object name and a lower-level object name is represented by an absolute object name. The operation-target flag indicates a target status of an object when it is "1", and indicates a non-target status when it is "0". For example, an object having a relative object name "Layer" has an absolute object name "SystemLayer", and has an upper-level object named "System" and a lower-level object named "SystemLayeySubnetwork". The operation-target flag of the object "Layer" is set to "1", indicating that this object is a target of the object operation. The tree of the tree-control unit 4 is shown by using relative object names in FIG. 7.

The absolute object names are provided in order to indicate hierarchical relationships between objects, and are used when object values/conditions are actually acquired or settings are actually made. The relative object names are defined without regard to the hierarchical relationships between objects, and are used when access is made to objects from an external environment. In such a case, the tree-control unit 4 refers to the tree information of the table format, and attends to conversion from a relative object name to an absolute object name, thereby making it possible to handle the object.

In FIG. 6, the client 1 sends an object-handling request for the plurality of objects to the message processing unit 2. Based on the object-handling request, the message processing unit 2 requests the tree-control unit 4 to conduct an object search. Upon receiving an object-search reply from the tree-control unit 4, the message processing unit 2 sends a plurality of object-handling requests simultaneously to a plurality of target objects. In so doing, information about the reply handler 5 is attached to the object-handling requests.

Upon receiving the object-handling requests, the objects are operated, and transmit object-handling replies to the reply handler 5 after the completion of the operations. The reply handler 5 receives the object-handling replies as events that take place in an asynchronous manner, and forwards the object-handling replies to the message processing unit 2. After all the object operations are completed, the message processing unit 2 sends an object-handling reply to the client 1.

In this manner, object operations are performed while the message processing unit 2 and the objects 3 operate asynchronously from each other. The message processing unit 2 ascertains that all the object operations are completed when it receives all the expected object-handling replies, and sends the object-handling reply to the client 1.

Figure 9:
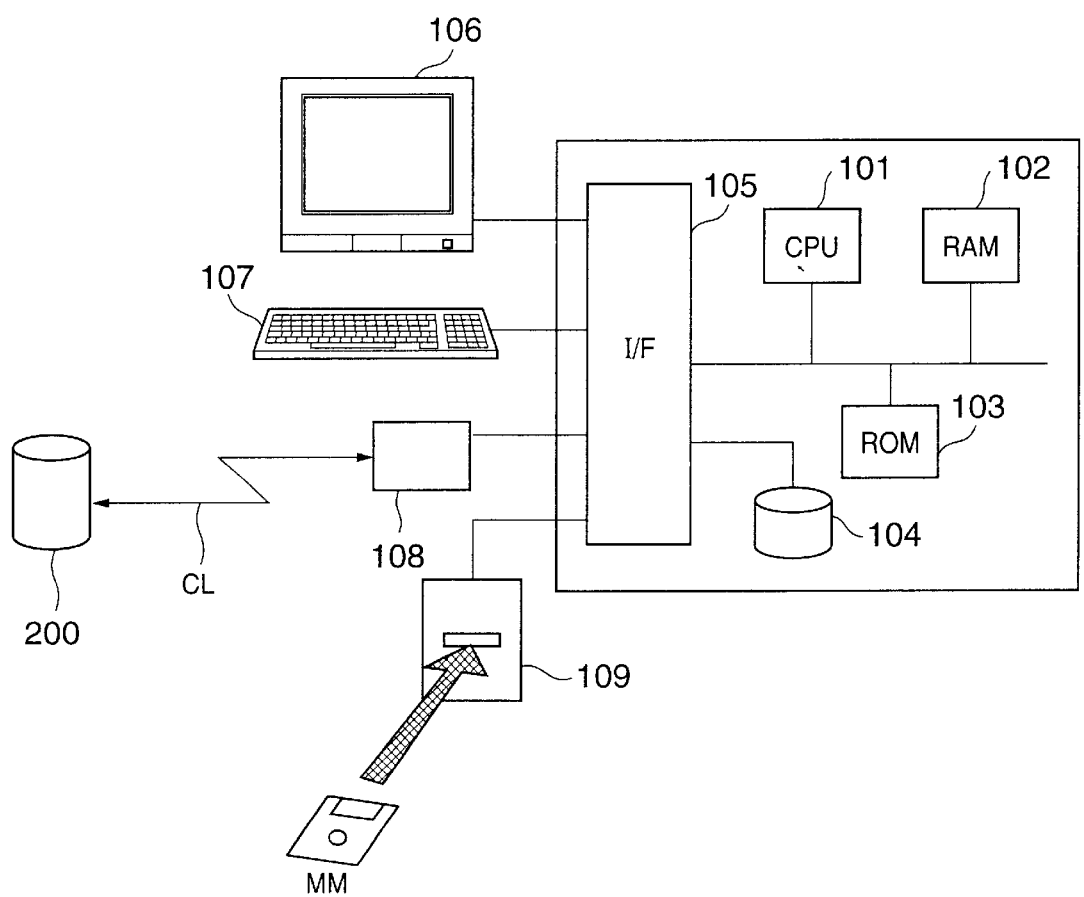
FIG. 9 is an illustrative drawing showing an example of a computer system used for implementing the present invention.
Figures 10A, 10B:
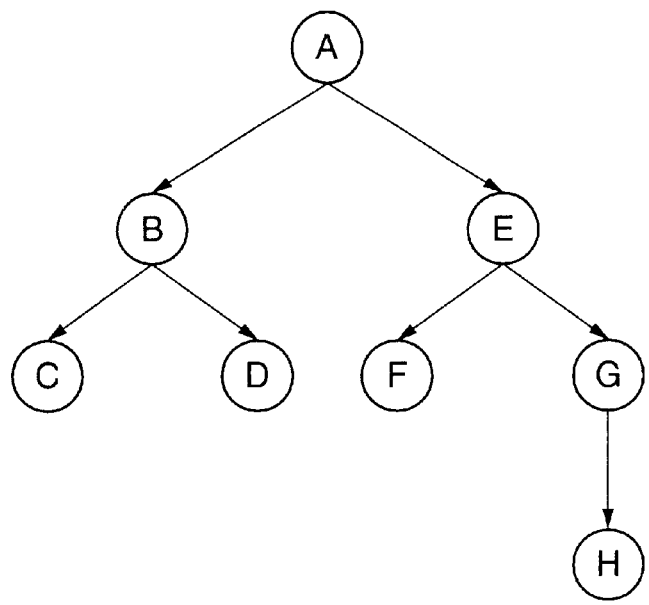
FIGS. 10A and 10B are illustrative drawings showing a tree model used for controlling of objects.

FIG. 9 is an illustrative drawing showing an example of a computer system used for implementing the present invention.

A computer system of FIG. 9 includes a CPU 101, a RAM 102, a ROM 103, a secondary storage 104, an interface unit 105, a display device 106, an input device 107, a modem 108, and a memory-medium drive 109.

A program for implementing an object control system of the present invention is provided via a memory medium MM, for example, which is inserted into the memory-medium drive 109. Alternatively, such a program is provided from a remote memory storage 200 connected to the computer system of FIG. 9 via a communication line CL. The program provided in such a fashion may be uploaded into the secondary memory 104 such as a hard drive via the interface unit 105, and may remain to be stored in the secondary memory 104 until such a time as an update of the program is necessary, for example.

When the program is to be executed, it is uploaded from the secondary memory 104 to the RAM 102, which serves to store the program and provide a work space for the CPU 101. The ROM 103 stores basic programs for controlling the CPU 101 as well as for controlling the entire computer system. Under the control of the basic programs stored in the ROM 103, the CPU 101 executes the program for implementing the object control of the present invention while making interactive communications with a user through the display device 106 and the input device 107 such as a keyboard and a mouse.

As described above, the present invention employs operation-target flags indicating whether each of the objects is a target of object handling or not a target of the object handling. The objects are controlled in a hierarchical fashion by the tree-control unit 4. In response to an object-handling request from the client 1, objects are searched for in the tree information, and checks are made as to whether the operation-target flags indicate a target status or a non-target status. Only with respect to those objects which are found to be a target, will such operations as acquisition of attribute values or making of settings be made in accordance with the request sent from the client. This eliminates a possibility of an unnecessary and undesirable search being conducted in the tree information when an object-handling request is made. The present invention, therefore, provides more efficient handling of objects compared to where all the objects are treated in the same manner as part of the same tree.

Further, the present invention is not limited to these embodiments, but various variations and modifications may be made without departing from the scope of the present invention.

The present application is based on Japanese priority application No. 10-293194 filed on Oct. 15, 1998, with the Japanese Patent Office, the entire contents of which are hereby incorporated by reference.

What is claimed is:

1. A method of controlling objects in an information processing system, comprising:

representing objects by a tree having a hierarchical structure;

providing each of the objects with a first operation-target flag which indicates whether a corresponding object is a target of a given operation;

setting a second operation-target flag in an object handling request, the second operation-target flag indicating whether a group consisting of some of the objects is a target of the given operation; and performing the given operation on an object upon receiving the object handling request for the given operation only if the second target flag of the object handling request as well as the first operation-target flag of the object indicates that the object is a target of the given operation.

2. The method as claimed in claim 1, wherein said performing is performed with respect to different objects sequentially such that said performing is performed with respect to a given object only after a reply indicative of a completion of the given operation is obtained from another object on which said performing was performed immediately prior to the given object.

3. The method as claimed in claim 1, wherein said performing is performed with respect to different objects in a parallel fashion.

4. A device for controlling objects, comprising:
- a message processing unit which receives an object-handling-request message from a client; and
- a tree-control unit which controls the objects in a hierarchical structure, attaches a first operation-target flag to each of the objects in order to indicate whether a corresponding object is a target of a given operation, and sets a second operation-target flag in the object handling request, the second operation-target flag indicating whether a group consisting of some of the objects is a target of the given operation wherein said message processing unit performs the given operation on an object upon receiving the object-handling-request message for the given operation only if the second target flag of the object handling request as well as the first operation-target flag of the object indicates that the object is a target of the given operation.

5. The device as claimed in claim 4, wherein said tree-control unit stores names of upper objects and lower objects in relation to a given object.

6. The device as claimed in claim 4, wherein said message processing unit performs the given operation on a given object only after a reply indicative of a completion of the given operation is obtained from another object on which said message processing unit performed the given operation immediately prior to the given object.

7. The device as claimed in claim 4, further comprising a reply handler unit which receives a reply indicative of a completion of the given operation from a given object on which said message processing unit performed the given operation, and reports a receipt of the reply to said message processing unit, wherein said message processing unit performs the given operation on different objects in a parallel fashion.

8. A memory medium having a program embodied therein for controlling a computer to control objects, said program comprising:
- a message processing unit configured to receive an object-handling-request message from a client; and
- a tree-control unit which controls the objects in a hierarchical structure, attaches a first operation-target flag to each of the objects in order to indicate whether a corresponding object is a target of a given operation, and sets a second operation-target flag in the object handling request, the second operation-target flag indicating whether a group consisting of some of the objects is a target of the given operation wherein said message processing unit performs the given operation on an object upon receiving the object-handling-request message for the given operation only if the second target flag of the object handling request as well as the first operation-target flag of the object indicates that the object is a target of the given operation.

9. The memory medium as claimed in claim 8, wherein said tree-control unit stores names of upper objects and lower objects in relation to a given object.

10. The memory medium as claimed in claim 8, wherein said message processing unit performs the given operation on a give object only after a reply indicative of a completion of the given operation is obtained from another object on which said message processing unit performed the given operation immediately prior to the given object.

11. The memory medium as claimed in claim 8, wherein said program further comprises a reply handler unit which receives a reply indicative of a completion of the given operation from a given object on which said message processing unit performed the given operation, and reports a receipt of the reply to said message processing unit, wherein said message processing unit performs the given operation on different objects in a parallel fashion.

* * * * *